United States Patent

[11] 3,612,687

| [72] | Inventors | Melvin S. Cook<br>Scarsdale, N.Y.;<br>Edward M. Ulicki, East Paterson, N.J. |
|---|---|---|
| [21] | Appl. No. | 745,465 |
| [22] | Filed | July 17, 1968 |
| [45] | Patented | Oct. 12, 1971 |
| [73] | Assignee | Holobeam Inc.<br>Paramus, N.J. |

[54] CREDIT CARD SYSTEM
11 Claims, 5 Drawing Figs.

[52] U.S. Cl. .................................................. 356/71, 350/96
[51] Int. Cl. .................................................. G06k 9/08, G02b 5/14
[50] Field of Search ........................................... 356/71; 350/3, 96

[56] References Cited
UNITED STATES PATENTS

| 3,435,244 | 3/1969 | Burckhardt et al. .......... | 356/71 X |
| 3,178,993 | 4/1965 | Ferris et al. ................ | 350/167 |

*Primary Examiner*—Ronald L. Wibert
*Assistant Examiner*—Conrad Clark
*Attorney*—Hopgood and Calimafde ABSTRACT: A credit card system is described wherein a credit card has an area thereof provided with a pattern representative of a code. A card pattern reader is provided wherein selected portions of the pattern are decoded for verification of the code represented by the pattern. The credit card system as described provides a system secure from fraudulent credit card use.

PATENTED OCT 12 1971 3,612,687

INVENTORS
MELVIN S. COOK
EDMOND ULICKI
BY
Hopgood &Calimafde
ATTORNEYS

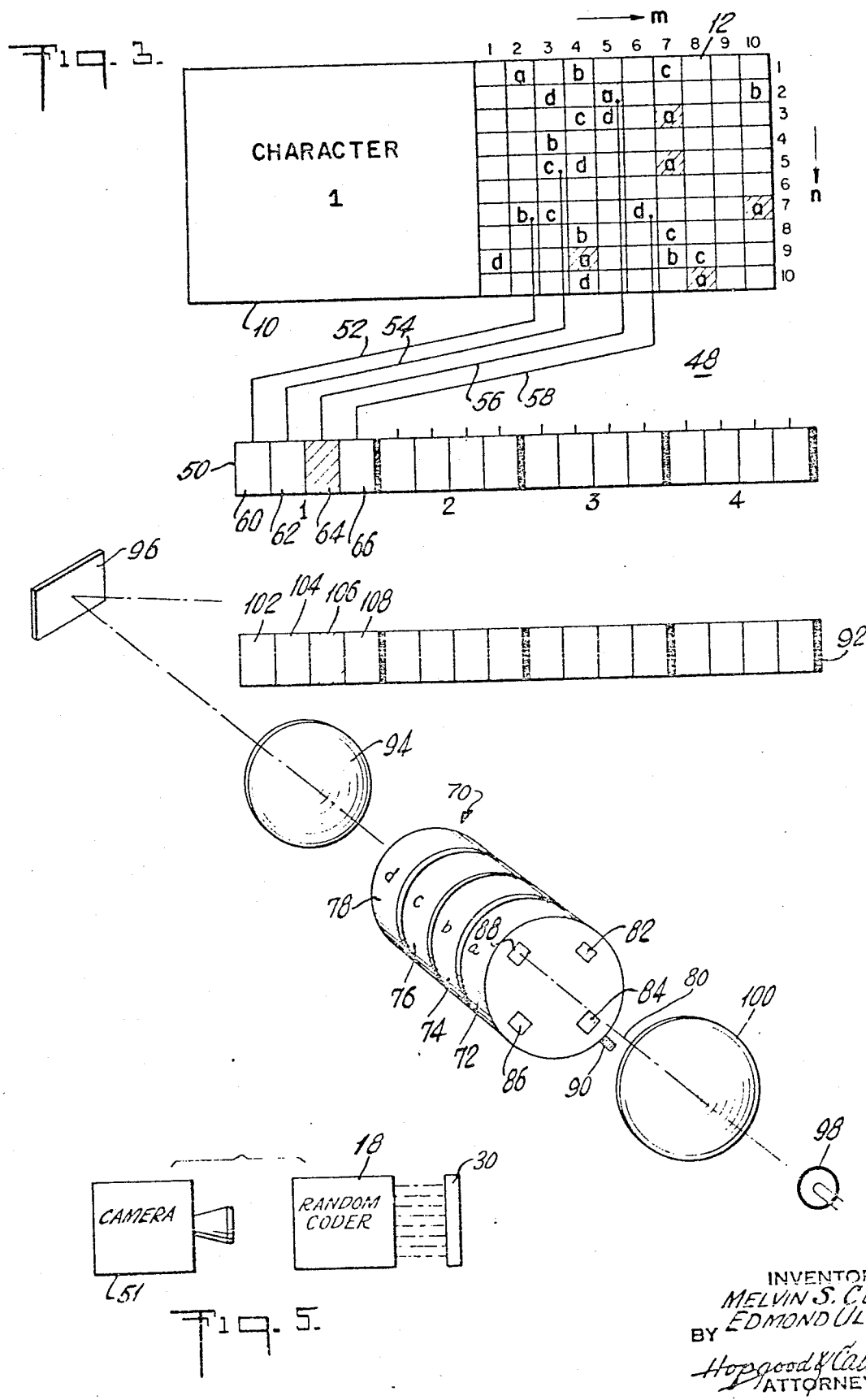

CREDIT CARD SYSTEM

This invention relates to an apparatus and method of identification and verification of credit cards and the like.

Credit card systems are subject to several quite costly fraudulent abuses. A first type of fraud involves the stolen or lost credit card which may easily be used by another party by the mere forging of a signature. This fraud is quite frequently encountered because it is difficult to impart to the card a foolproof association with the true subscriber whose legible identity must appear in some manner on the card when it is presented for credit. It has been proposed to place a picture of the true subscriber on the card to prevent unauthorized use in case of loss or theft. Although this picture does identify the subscriber, the picture does not eliminate a major second fraud, i.e. the counterfeit card. What is needed is a credit card system which provides protection both against the lost or stolen credit card and the counterfeit card.

It is therefore an object of this invention to provide a credit card verification and identification system which is secure from misuse resulting from counterfeit or lost or stolen credit cards.

It is a further object of this invention to provide a credit card system wherein the identity of the true card verification and identification subscriber is easily established with a substantial improvement in security.

These objects are accomplished by our invention which is described as follows in conjunction with the drawings, wherein FIG. 1 is a front view of a typical credit card as used in this invention with a digital pattern and explanatory notations;

FIG. 3 is a partial perspective schematic representation of a card reader used to identify a card in accordance with the invention;

FIG. 5 is a schematic representation of the device and method used to form transparencies used in the card reader of FIG. 3.

Briefly stated, out invention contemplates a credit card system wherein a card carried by a subscriber is provided on an area thereof with a pattern of discrete distinguishable locations. The pattern provided on the card has a random distribution corresponding to a multicharacter alphanumeric code word specially assigned to that subscriber. A card reader is provided at a location where the subscriber wishes to use his card. The card reader selects particular locations on the pattern and, according to a code number provided by the subscriber, checks that code number against the code word provided on the card and thereby verifies the authenticity of the card and identity of the subscriber.

Figure 1:
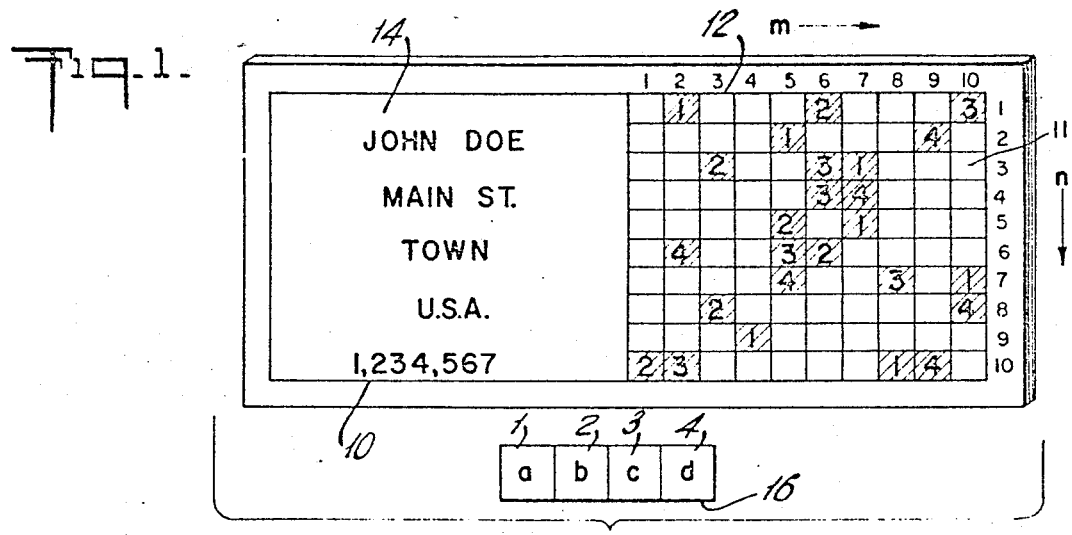

In FIG. 1, a card 10 is illustrated which has an area generally indicated at 12 with a digital-type e.g. dark-light pattern formed at locations such as 11 arranged generally in a rectangular fashion and composed of columns $m$ and rows $n$. The columns are numbered from 1 through 10 and similarly the rows are numbered 1 through 10. It is to be realized that the number of columns and rows shown in FIG. 1 is merely for illustrative purposes and many more may be used than are indicated in the figure.

Adjacent the digital pattern 12 is a space 14 available for the name of the subscriber, his address and charge number. Below the card 10 is shown an alphanumeric code word 16 here shown as composed of four characters 1, 2, 3 and 4. Each subscriber is given a code word to be remembered by him since it does not appear on his card. As herein shown the four characters of code word 16 as have each been given respectively the form of the letters $a$, $b$, $c$ and $d$. It is realized that in more sophisticated systems, a more elaborate code word can be used wherein each of the characters 1 through 4 may be formed from, for instance 35 different characteristics as provided by the 26 letters of the alphabet and the numbers 1 through 9. For the purposes of clarity and explanation of the following description, each of the code characters 1 through 9 is restricted to the different form of the letters $a$, $b$, $c$ or $d$. Shorter code words may be used with, for instance, only two characters. The shorter code word may be desirable because it is more likely to be remembered by the subscriber.

The use of a four-character code word 16 is likely to result in several subscribers being given the same code word. In the example shown in FIG. 1, a total of four to the fourth power or 256 different code words are available. With a million subscribers, four thousand are likely to have the same code word. However, as explained below, the purpose of the code word is to partially identify the true subscriber. Thus, for the simplified four-character code word herein described, the likelihood of a fraudulent holder of the credit card guessing the four-character code randomly printed on the card is only 1 in 256. By increasing the number of characteristics in the code word and/or by increasing the possible alphanumeric forms each character may take the probability that someone having a stolen card in his possession would guess the proper code word for the stolen card may be reduced as desired.

In the pattern 12, 100 digital locations are provided. As indicated in the pattern 12, selected ones of these locations are shaded with numbers placed within the shaded portions. These numbers are provided in the figure only to aid in the understanding of the invention and it should be realized that an actual subscriber's card will not include the numbers but only the shaded or blackened locations. The pattern 12 appears at a known location on the card to provide proper alignment of all subscriber cards within the card readers.

Figure 2:
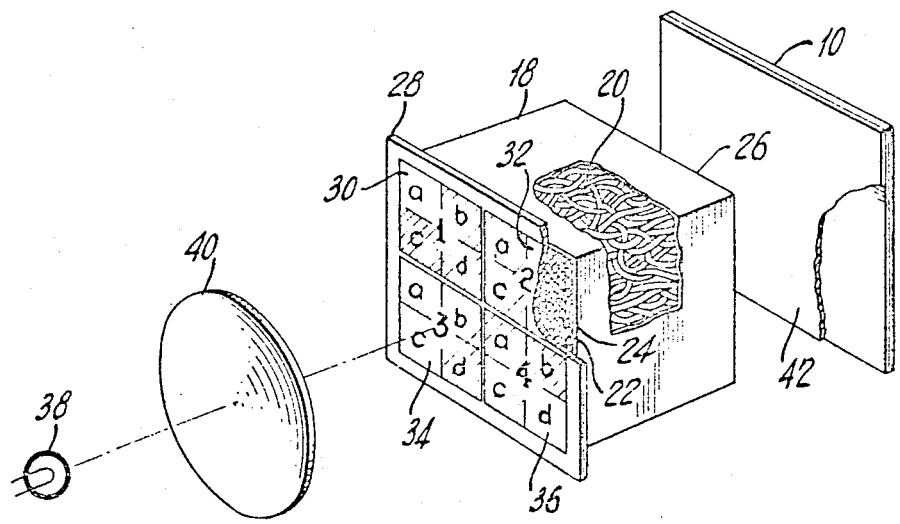
FIG. 2 is a perspective view of a device for producing a card as illustrated in FIG. 1.

In order to understand the operation of the credit card verification system as well as the coding system employed, reference is now made to FIG. 2 which shows a device for producing a random pattern on the card corresponding to the four-character code word assigned to the subscriber. A random coding device 18 is illustrated which is composed of a bundle of fiber optics wherein the fibers are randomly intertwined. The random nature of the fiber distribution is clearly illustrated by the multiple fibers 20. These fibers 20 commence at a front face location, for instance 22 on the face 24 of the device 18, and each fiber 20 terminates at the rear face 26 which is opposite to the face 24. The fibers 20 commence at a first location on the face 24 and terminate at an opposite face location which does not correspond to the location on the face 24. Since the distribution is random, it is of course possible that several fibers could coincidentally terminate at approximate corresponding locations, but the general intent is to have the fibers randomly optically interconnect the front face 24 with the rear face 26.

Such a fiber optic bundle may be formed by weaving a plurality of these fibers in a random fashion. Thereafter, the ends are cut off and the random woven structure is molded to retain fixed positions of the fibers in the structure. The fibers may be made of glass or plastic. The fibers transmit light incident upon the face 24 to the rear face 26. The fibers may transmit light reversely from the face 26 to the front face 24. The number of fibers used in the structure 18 is determined on the basis of the desired number of bits into which the front face 24 is to be divided, as well as the cross-sectional size of the fibers. The fibers may range in cross-sectional diameter dimension from 20 microns to a 16th of an inch. The fibers generally are circular in cross section and are arranged adjacent one another so that the light spots appearing on the rear face 26 are circular rather than square. However, for purposes of explaining the operation of the system, each fiber is assumed to fit concentrically within each square location 11 of the pattern. For the example shown in FIG. 1, it is assumed that 100 fibers are used and are uniformly distributed over the surfaces 24 and 26 to provide a digital encoding of the pattern incident upon the front face 24. It should be realized that it would be relatively simple to provide a fiber encoder as just described wherein each fiber has a dimension of approximately 100 microns so that a total number of about a million fibers is used in the entire structure to provide a field pattern on the card of FIG. 1 amounting to 1,000 × 1,000 locations.

Immediately adjacent the front face 24 is a mask 28. This mask divides the front face into four equal sections corresponding respectively to the characters 1, 2, 3 and 4 of the code word 16 shown in FIG. 1. A portion of the mask covering the character two section of the face 24 is cut away to illustrate the fibers incident upon the front surface 24 and the proximity of the mask to this face. Further division is made in the mask 28 wherein each character section is subdivided into four equal sections labeled $a$, $b$, $c$ and $d$, and which in turn correspond to the various characteristic forms that each character in the code word 16 may take. For the particular form-character code word illustrated in FIG. 1, the areas 30, 32, 34 and 36, corresponding respectively to the letters $a$, $b$, $c$ and $d$, are unmasked, whereas all of the other areas are fully masked. A light source 38 is provided which acts through a lens 40 to illuminate the front face 24 through the mask 28.

Adjacent the rear face 26 is a credit card 10 which is provided thereon with a photosensitive layer 42 which responds to the light passed through by those fibers 20 opposite the unmasked areas 30, 32, 34, 36. Since the fibers 20 randomly interconnect the front and rear faces 24 and 26, a dot pattern appears on the light-sensitive surface 42. This dot pattern, by conventional development processes, is transformed into a pattern wherein the light dots become dark and the masked areas appear as white spaces and printed on the card surface by any known process, such as by a photographic operation, to produce the coded digital pattern as shown on card 10 in FIG. 1.

Each characteristic area, such as 30, on the mask 28 in the embodiment shown in FIG. 2 has approximately 100/16 equal to about 6 fibers for transmitting light to the rear face 26 to illuminate a corresponding number of about 6 locations on the card.

Similarly, if the number of subdivisions of each character section is reduced, a greater number of spots will be obtained, provided of course that the number of fibers is not changed. If a million fibers are used and a three-character code word is used with each character capable of taking about 35 different forms, then $10^6/35^3$ equal to about 23 fibers are available for providing a pattern on the card for each characteristic form. Different credit cards having different code words formed thereon by replacing the mask 28 with a mask having a different coding. As many different masks are employed as there are combinations of code words. Such masks may be easily made up by photographing a pattern formed, for example, on an oscilloscope which in turn is controlled by a computer.

Alternatively the pattern produced on the card 10 may be directly printed on the card by a computer-controlled printer which places on the cards the desired number of dots with the spaces and locations controlled by the computer. The pseudorandom nature of the dot pattern on the card may be reproduced by a computer into which a set of random numbers is fed for the purpose of distributing the dots for a selected code word in a random fashion.

Since the fiber optic device 18 of FIG. 2 is constructed in a random fashion, the precise encoding provided therewith is not necessarily known. It will of course be known where a computer is used to generate the random coding. However, it is not important that this be known as is explained as follows in connection with the description of the card reader.

Figure 4:
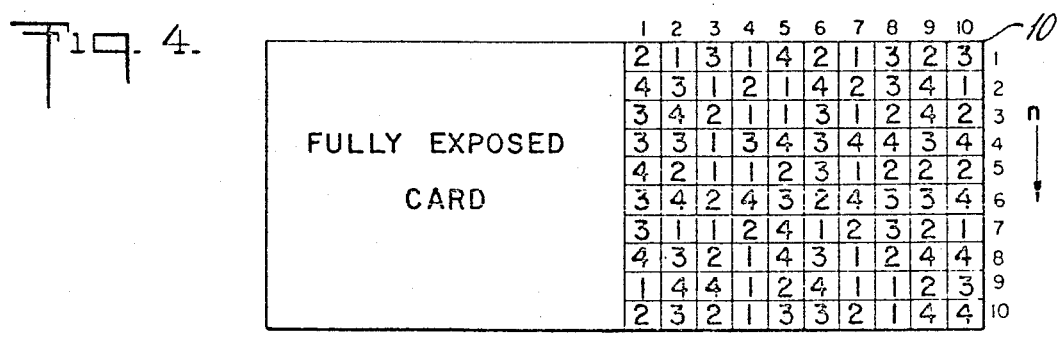
FIG. 4 is a front view of a credit card with a filled pattern in accordance with the invention and explanatory notations.

Assume for the moment that the full pattern produced by the fiber optic device 18 or by a computer places all portions of the characters of the code word 16 in a random fashion on the card 10 as illustrated in FIG. 4. As shown, the numbers in the locations correspond to the respective character sections 1 through 4 of FIG. 2. The same number (25) of locations is exposed for each of the characters. Furthermore, approximately the same number of locations is exposed for each letter within a character section since all of the lettered areas on the mask 28 are of the same area.

The card 10 of FIG. 3 is illustrative of the locations exposed thereon for the case where the entire character 1 would be left unmasked by the mask 28. Each of the locations is shaded and provided therein with a letter corresponding to a fiber which commences at a face 24 location adjacent the letter $a$, $b$, $c$ or $d$ of character 1. However, as indicated in FIG. 1, the code word used as an example requires that the first character have the letter $a$, so that only the $a$ locations of character 1 of the card are exposed as illustrated by the shading produced on the card by the fiber optic device 18. It will thus be noted that all of the locations corresponding to the terminations of the optical fibers containing character area 30 of mask 28 are exposed on the card 10 of FIGS. 1 and 3.

FIG. 3 further illustrates a fiber optic card reader wherein selected locations of a card are sampled, read and displayed on a display 50. For illustrative purposes, only four fibers 52–54–56–58 are shown connected from locations adjacent the card 10 to the display 50 to produce a display of decode one character on display 50. More fibers for the decoding of one character of course could be used.

For this purpose card 10 is placed in a cardholder, not shown, which accurately places each of the selected locations on the coded pattern 12 in registration with the fibers 52 through 58. This places a particular location opposite one end of each of the fibers which thereupon transmit the light incident upon that card location to the display 50 having display positions 60, 62, 64 and 66 for displaying the first character of the code word. The fibers are chosen to pass light from four different locations on the coded pattern on the card corresponding to character forms $a$, $b$, $c$ and $d$. In this way, no matter which form the character 1 takes, one of the fibers will always be incident upon an exposed location.

The display 50 comprises four display locations for each character and, as mentioned, for the character 1, these are display locations 60–62–64–66. In a similar manner, display locations are provided for the other three characters, which may thus also be decoded by fibers in optical contact with selected locations on the card 10. For purposes of clarity, the fibers for these other characters are not depicted in FIG. 3 although the card 10 illustrated in FIG. 1 does indicate the pattern locations exposed for the characters 2, 3 and 4.

When a subscriber presents his credit card for credit, the party extending credit, having a card reader as shown in FIG. 3, places the card in the card holder. The subscriber advises the seller of his code word which is then dialed into a wheel code detector 70. The wheel detector comprises four wheels 72–74–76–78 which are axially positioned adjacent one another on a common axis 80. At precise locations in each wheel are mounted four photographic transparencies 82–84–86–88. The wheels 72 through 78 correspond respectively with characters 1 through 4 and the transparencies 82 through 88 contain visual representations respectively of the randomly coded patterns of the letters $a$, $b$, $c$ and $d$. That is, on each transparency is a photograph of a light pattern associated with each of the character letters $a$–$d$. The wheel 72 has a precise alignment position as indicated by a stop 90 which runs axially along each of the wheels 72–74–76–78 and permits precise alignment of each of the transparencies so that a single light beam may be passed through each one of the aligned transparencies to provide a display 92 after proper focusing and reflection via a lens 94 and a mirror 96 and an optical fiber system similar to fibers 52–58 provided between mirror 96 and display 92 and not shown in the drawings. The display 92 is arranged in substantially parallel alignment with the display 50 to provide easy correlation of the display locations.

Thus if the subscriber states his code to be as shown at 16 in FIG. 1, i.e. $a$, $b$, $c$, $d$, then the seller or person verifying the card dials this code onto his code wheel 70, directs a beam of light from a source 98 through a lens 100 through the $a$, $b$, $c$ and $d$ transparencies of code wheels 72–74–76–78 respectively to produce display 92 corresponding to the setting of the code. Since at the same time he places the card in the card reader 48, a quick comparison of the two code patterns, that is, the pattern produced at the card reader and that produced by the code can be made. If the card display 50 and the code wheel display 92 are identical, the seller is assured that the customer is the current holder of the card as only the proper individual is aware of the code word dialed into the code wheels. If the two displays are not identical, then the card holder either does not know the code word (indicating a possible stolen card) or that the card has been coded by a fraudulent coder (indicating a counterfeit card).

The transparencies used in the code wheels 72–78 are made by using a random coder and mask similar to that shown in FIG. 2. This is illustrated for instance in FIG. 5 wherein the random coder is illuminated for each of the characters a, b, c and d, and the resultant random-coded pattern such as that similarly and respectively formed on card 10 by a camera 51. To enable the complete four-character pattern to be formed when the dialed transparencies on code wheels 72–78 are aligned as shown in FIG. 4, the transparencies for each of the four code wheels preferably each carry the relevant coded pattern at alternating quadrants therein. In an alternate process to manufacture the transparencies, a card 10 having provided thereon only those randomly formed character locations corresponding to a particular character is placed in the card reader and the information recorded on the camera. This is repeated for each character. Thus, the negative in the camera is now exposed with the information required to form the transparency 88 on the wheel 72. By properly controlling the development process, a transparency is provided which provides a black location corresponding to the display location 106 on the verification display 92. It is to be realized that in the case where a computer is used to organize the character locations, the method for generating the transparencies as described in relation to FIG. 5 may be dispensed with by the direct exposure of a camera to, for instance, an oscilloscope which is controlled by a computer.

Several unique advantages arise from the credit card system as thus described. A plurality of card readers 48 may be generated which sample with the use of the fiber optics different character locations. Thus, if one reader is stolen, in order to attempt to backtrace the code used in the entire system, only those readers corresponding to the one illustrated in FIG. 3 can be decoded. Nevertheless, even when a card reader is stolen and a card is obtained by theft, the system can be rendered very difficult to decode.

Assume, for example, that a person in fact tries to ascertain the code with the use of a card reader and he places the card in the card reader and starts to try to determine which combination of letters of the characters provide the proper matching for the card he has improperly obtained. In the example shown, and with random coupling of the fibers to the display, he will have to try 256 different locations in order to find a proper combination. However, it may be very simple to impart sufficient complexity to the system whereby instead of four transparencies in each code wheel, a larger number is employed so that the total number of wheel position combinations one must check to ascertain the proper code number for the particular card involves a herculean task. For instance, where three characters are used in a code and each character may assume the form of 26 letters and nine digits, a total of about 42,875 wheel position combinations exists.

The system as thus described provides a unique credit card security system wherein security is imparted to both the card and to the device for identifying the card, thus rendering the system substantially counterfeit- and theftproof.

The system is reliable and inexpensive to make, since the fiber optics used in the card readers can be simply made.

While the forgoing explains in some detail an invention relating to a credit card system, variations and modifications of the invention are understood to be within the scope of the invention as defined by the following claims.

We claim:

1. A credit card verification system comprising a credit card assigned to a subscriber and including an area with a pattern of locations arranged in a predetermined random manner in correspondence with a code word uniquely associated with the card subscriber and having distinguishable characteristics with selected ones of said locations being chosen as representative of said code word, means for reading predetermined ones of said selected locations representative of the code word randomly coded in said pattern and for providing signal indicative of the features of said selected locations, and code word generating means for providing in response to a multidigit identification code a comparison signal, and means for comparing said comparison signal and said signal derived from the reading of said ones of said selected locations to thereby establish subscriber verification when said signals bear a predetermined relationship to one another.

2. The credit card verification system as recited in claim 1 wherein said credit card is provided with a pattern of locations with optically distinguishable features.

3. The credit card verification system as recited in claim 2 wherein said credit card is provided with a substantially rectangular array of dark and bright locations.

4. The credit card verification system as recited in claim 1, wherein said code word is composed of a character having several forms and wherein the pattern on said credit card further comprises a first character form pattern and a second character form pattern, said patterns being interleaved, and
   wherein said card reading means reads selected locations of each of said first and second character form patterns to provide a signal representative of the characteristics of said read selected locations.

5. The credit card verification system, as recited in claim 1, wherein said code word is composed of several characters each having several forms and wherein the pattern on said credit card is divided into a plurality of interleaved pattern groups, each of said group utilizing different pattern locations, with each of said groups being representative of a character form, and
   wherein said card reading means reads selected locations of each of said groups to provide a signal representative of the character forms used in the code word on said card.

6. The credit card verification system as recited in claim 1, wherein said card locations are provided with optically distinguishable features and wherein said card reading means further comprises
   a plurality of optical fibers and said signal comparing means comprises
   a display,
   said optical fibers optically coupling said several selected locations on said credit card to said display to provide a signal optically representative of the code word on said pattern.

7. The credit card verification system as recited in claim 6, wherein said code word generating means provides said comparison signal optically representative of the characteristics of the optically read locations on said credit card.

8. The credit card verification system as recited in claim 7, wherein said signal comparing means further comprises
   a second display,
   a photographic transparency having an inscription thereon corresponding to the desired features of said selected locations, and
   means for illuminating said second display with said inscription on the photographic transparency.

9. The credit card verification system as recited in claim 8, wherein the code word is composed of a character having several forms and wherein the pattern on the credit card further includes a first character form pattern and a second character form pattern, said patterns being interleaved and
   wherein said card-reading means reads said selected locations of each of said first and second character form patterns to provide a signal representative of the features of said scanned locations, and
   wherein said code word generating means further comprises
   a pair of apertured code wheels rotatably mounted about a common axis, the features of different wheels being adjustable in axial alignment with one another,
   a plurality of photographic transparencies each having inscriptions thereon corresponding to desired features of selected locations of the first and second character forms, said photographic transparencies being mounted in apertures of said code wheels displaying the inscriptions thereon, and wherein said means for illuminating said second display includes a light source and means for directing said light source through aligned ones of said transparencies and onto said second display to provide a visual display representative of the characteristics of said selected locations.

10. The credit card verification system as recited in claim 1 and further including a plurality of different card-scanning devices, each scanning preselected different locations representing the code word coded in the credit card pattern, and a plurality of code word generators, each providing a comparison signal indicative of the desired features of scanned locations for one of said different card-scanning devices.

11. A method of operating a credit card system with subscribers, comprising forming a plurality of different credit cards each having an area thereof provided with a digital pattern of locations having distinguishable features with selected ones of said locations being chosen as representative of a code word uniquely associated with the holder of the card, providing at geographically separate places a different card-scanning device and a correspondingly different code word-generating device for scanning a different portion of the code word pattern on a credit card from the scanned by other scanning devices located at geographically separate places, and verifying the scanned portion of said code word of a card at each geographically separate place with a code word generating device in response to a code word provided by the credit card holder.